United States Patent [19]

McDermott et al.

[11] Patent Number: 5,229,551
[45] Date of Patent: Jul. 20, 1993

[54] HYSTERESIS COMPENSATION FOR A DIGITIZER TABLET

[75] Inventors: Robert M. McDermott, Weston; Thomas C. Zalenski, Prospect, both of Conn.

[73] Assignee: Summagraphics Corporation, Seymour, Conn.

[21] Appl. No.: 787,387

[22] Filed: Nov. 4, 1991

[51] Int. Cl.$^5$ .............................................. G08C 21/00
[52] U.S. Cl. ........................................................ 178/18
[58] Field of Search ................................ 178/18, 19, 87

[56] References Cited

U.S. PATENT DOCUMENTS

| | | | |
|---|---|---|---|
| 4,255,617 | 3/1981 | Carau, Sr. et al. | 178/19 |
| 4,686,331 | 8/1987 | Burgess | 178/19 |

Primary Examiner—Stafford Schreyer
Attorney, Agent, or Firm—Rosen, Dainow & Jacobs

[57] ABSTRACT

A digitizer tablet providing hysteresis compensation in which the X and Y coordinates of a pointing device are measured at different times. In order to enable the tablet to report X and Y coordinates that when displayed will more accurately reflect the pointing device movements, a correction algorithm, built, for example, into the controlling software, estimates and reports what the first measured coordinate would have been, measured when the second coordinate is measured, based upon the calculated velocity and acceleration of the pointing device. A similar technique can be used to correct the reported value of the second coordinate. In a preferred embodiment, constant coefficients of a linear equation having as variables three consecutive coordinate values or three consecutive preprocessed coordinate values are predetermined and used in the correction algorithm. The preferred embodiment integrates the velocity and acceleration hysteresis compensation into a three point recursive noise filter.

22 Claims, 7 Drawing Sheets

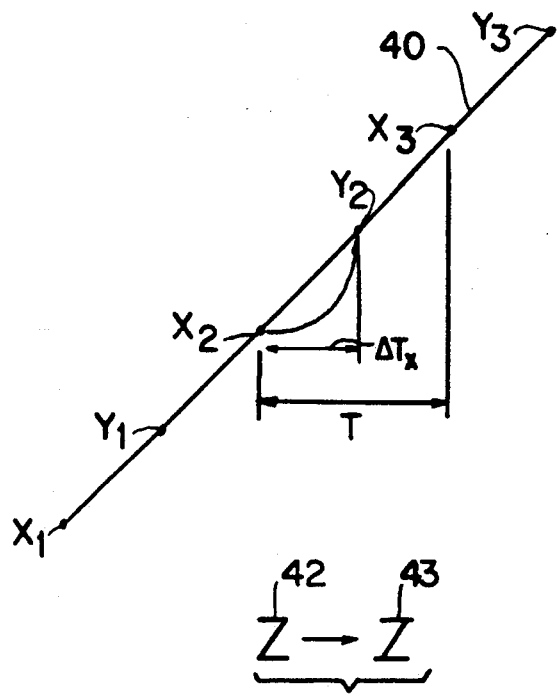
FIG. 3
FIG. 3A
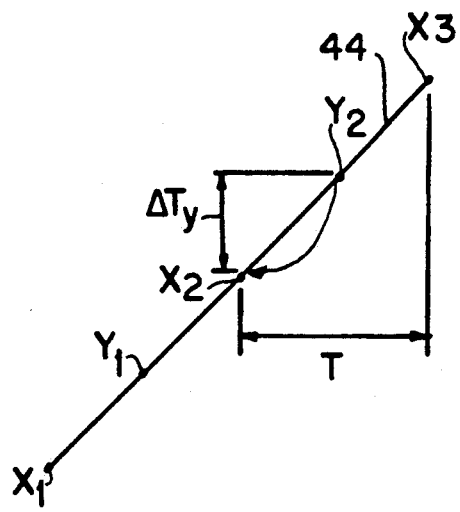
FIG. 4
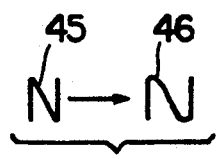
FIG. 4A

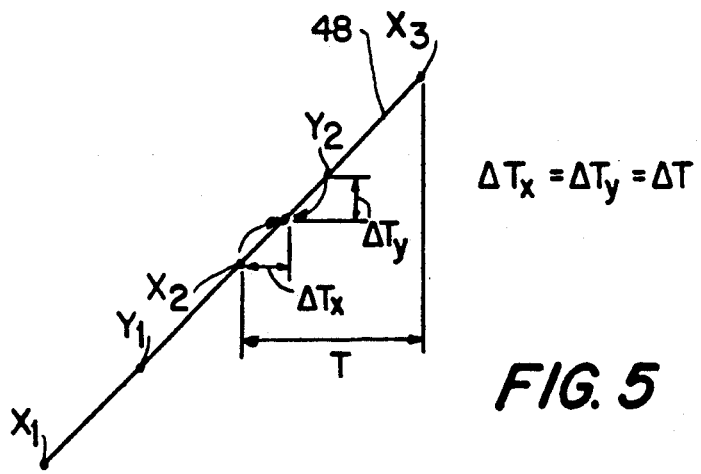
FIG. 5
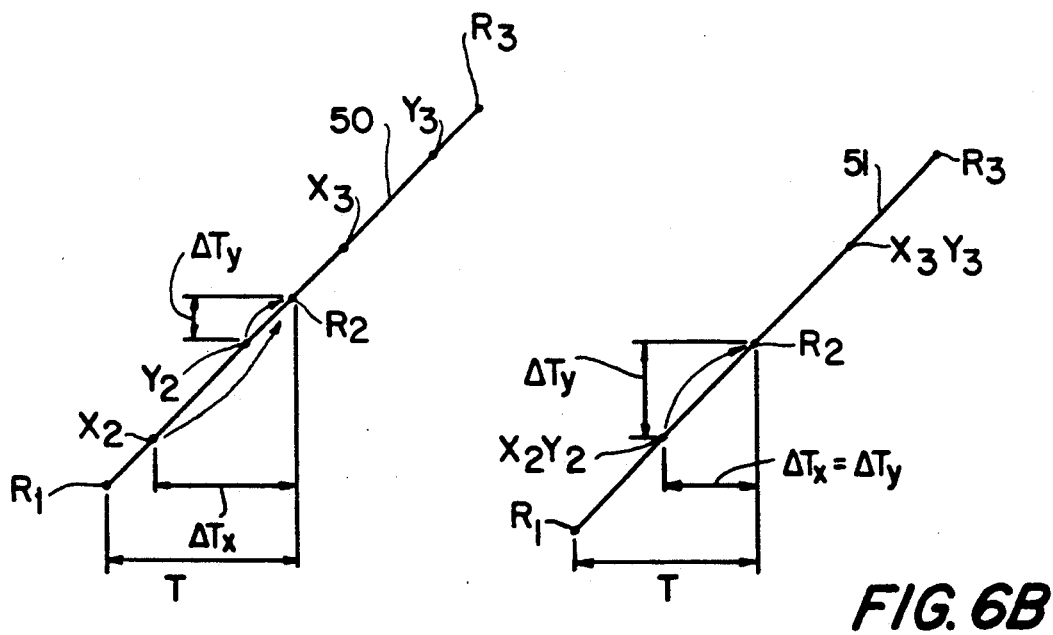
FIG. 6A
FIG. 6B
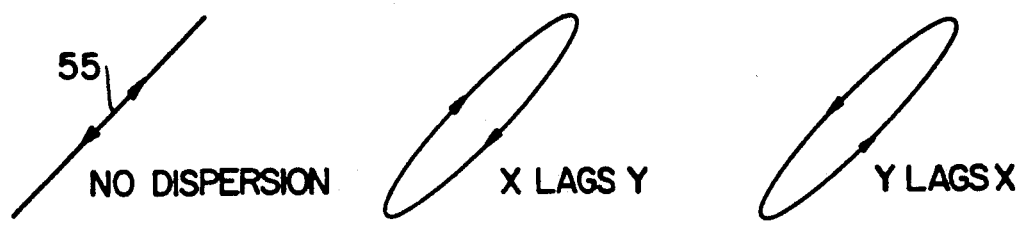
NO DISPERSION
X LAGS Y
Y LAGS X
FIG. 7A
FIG. 7B
FIG. 7C

HYSTERESIS COMPENSATION FOR A DIGITIZER TABLET

FIELD OF THE INVENTION

The present invention relates to digitizers that process data for determining the values of signals representing the respective coordinates of the location of a pointing device in a coordinate system. More particularly, the present invention is directed to providing compensation for the movement, or variations in the motion, of the pointing device across the surface of a digitizer tablet.

BACKGROUND OF THE INVENTION

Digitizers provide values in a given coordinate system that define the location of a pointing device on the digitizer tablet's surface. The operator typically manipulates the pointing device over the tablet's surface using a probe, for example, for tracing a pattern or design, or for creating a pattern or design. Typically, the tablet is connected to a host computer which displays on its monitor the traced or created pattern or design. The probe is commonly a stylus or a cursor that is either capacitively or inductively coupled to the tablet's surface. In many digitizers, the same controlling software and signal processing circuits are used for determining both X and Y coordinates of the pointing device position. In such digitizers, the signals coupled between the pointing device and the tablet's surface are sampled sequentially—say, first for the X coordinate, and then next for the Y coordinate—so that the respective signals for each of the coordinates are received and processed at different times by the digitizer. The signal processing occurs in real time, so that the user can observe displayed on his monitor the design or pattern while it is being traced or created.

One problem frequently encountered with digitizers that use sequential sampling of the coordinate value signals is their inaccurate responsiveness to changes in the location of the pointing device on the tablet surface. Depending upon the speed of motion of the pointing device, one location coordinate provided by the digitizer will lag behind the other location coordinate, sometimes referred to as "hysteresis". This hysteresis problem in the sampling of location signals is particularly annoying in tracing and free-hand drawing applications in which the continuous stream of data produced by the digitizer is recorded in memory as distinct from point-by-point operations in which only the coordinates of selected individual points are recorded.

Another hysteresis-related problem encountered when using digitizers that sequentially sample coordinate values is their sensitivity to relative motion of the probe especially when moved over a curved path. The reported probe positions do not accurately reflect the positions actually occupied by the probe while following this curved path.

These relative motion distortions can be reduced by algorithms that smooth the values provided by the digitizer apparatus. For example, U.S. Pat. No. 4,686,331 discloses the use of a smoothing algorithm for compensating the error in sequentially sampled coordinate values. However, this algorithm is retrospective, i.e., the delays associated with this calculated smoothing of the signal values adds to the delay inherent in the task of calculating coordinate values from the location signals that are sensed sequentially. Such retrospective smoothing does not improve overall digitizer performance, in that it compounds the problem of lack of responsiveness that is characteristic of digitizers using sequential sampling.

Another possible solution is described in U.S. Pat. No. 4,255,617, which is based on calculating the pointing device velocity in the direction of the first coordinate axis measurements made, and then reporting an adjusted first coordinate value based on where the pointing device should be when the second coordinate is measured. This suffers from similar problems to that described above because it assumes a constant velocity for the pointing device. This is not often the case during tracing and free-hand tablet uses when the probe is more likely to follow a curved path, in which the velocity along a coordinate is not constant.

SUMMARY OF THE INVENTION

An object of the present invention is an improved digitizer tablet which more accurately reports probe positions.

Another object of the present invention is to improve the responsiveness of a digitizer tablet by reducing the lag between a change in the location of the pointing device or probe and the report of the coordinate values of the new location.

Another object of the present invention is to provide improved probe flexibility by correcting for changes in the probe's velocity.

A further object of the present invention is to reduce overshoot in the compensation of the coordinate values.

The present invention achieves these and other objects by calculating a projected coordinate value for one or both of the coordinate signals sensed by the digitizer based not only on the calculated velocity of the pointing device, but also on a calculated acceleration of the pointing device.

It is a feature of the invention that calculation and compensation in the reported coordinates can be carried out in real time without a significant reduction in the reporting rate, by using equations in the calculation that are linear approximations of the more definitive equations. Moreover constants used in these equations can be predetermined and stored in the tablet. By this approach, little loss in accuracy results, but an enormous reduction in calculation time so that no significant responsiveness penalty is suffered.

Another feature of the invention is to integrate the us of pointing device acceleration compensation with noise filter techniques that reduce computer storage requirements.

BRIEF DESCRIPTION OF THE DRAWINGS

The features and advantages of the present invention may be better understood when the detailed description of the preferred embodiments provided below is considered in conjunction with the accompanying drawings wherein:

FIG. 3 illustrates a first solution to hysteresis, and FIG. 3A shows one effect;

FIG. 4 illustrates a second solution to hysteresis, and FIG. 4A shows one effect of this second solution;

FIG. 5 illustrates a third solution;

FIGS. 6A and 6B illustrate a fourth solution;

FIGS. 7A-7C illustrate various hysteresis effects;

DETAILED DESCRIPTION OF THE PREFERRED EMBODIMENTS

Figure 1:
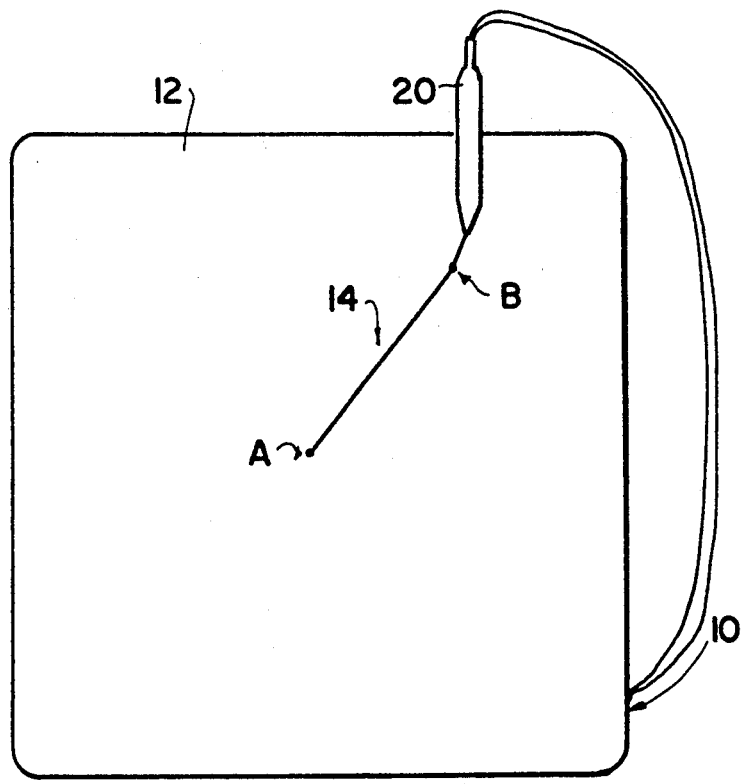
FIG. 1 is a schematic plan view of the working surface of a digitizer tablet, illustrating a path travelled by a stylus across the coordinate grid of the digitizer tablet.

FIG. 1 shows the working surface of a typical tablet 10 for a preferred embodiment of the present invention. This technology is well-known, and reference is made to U.S. Pat. Nos. 3,904,822; 4,368,351; and 4,996,393 as examples of known digitizer constructions suitable for use in the invention. What is common to these types of digitizers and to many others is that the same signal processing circuitry is used for processing the raw data derived from the interaction of the grid electrode system in the tablet and the pointing device, and thus the sensing of each of the two conventional X and Y coordinate locations of the pointing device is carried out sequentially. The problems that result will be explained in connection with FIGS. 1 and 2.

Figure 2:
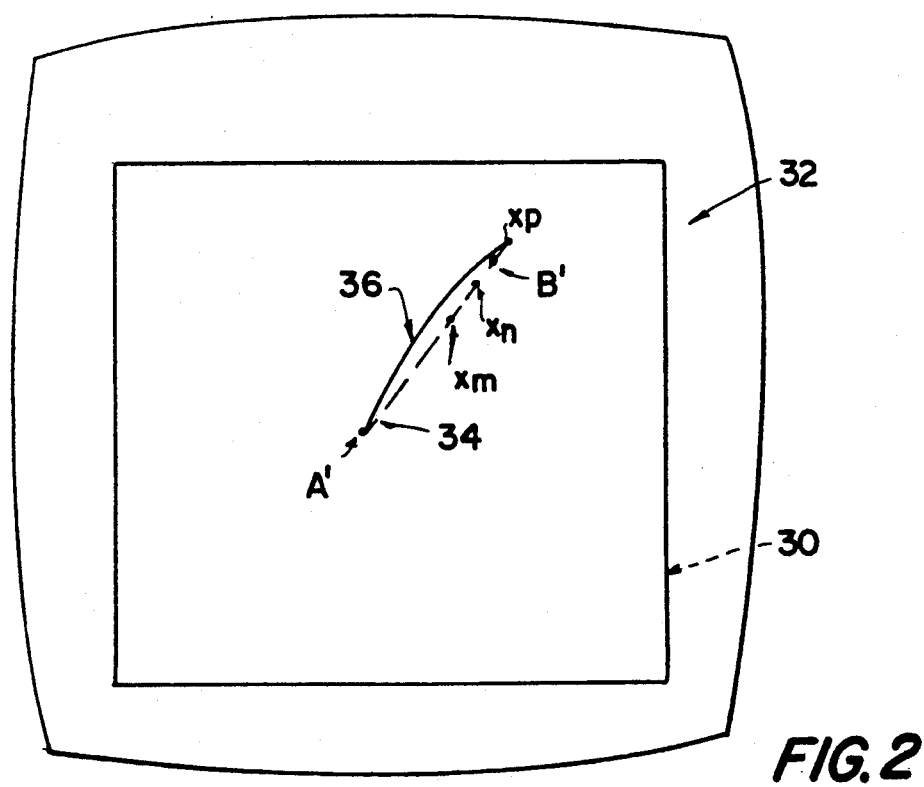
FIG. 2 is a schematic illustration of distortion of reported coordinate values that occurs in prior art devices when the stylus accelerates along a path corresponding to the path shown in FIG. 1.

The X and Y schematic grid 12 shown on the face of the tablet 10 of FIG. 1 is traversed along a line 14 that represents a path taken by a stylus 20 across the working surface of the tablet 10 from location A to location B. FIG. 2 illustrates some types of errors in reported stylus location that are induced by sampling hysteresis in prior art digitizers. FIG. 2 shows a diagram as displayed on the video monitor screen 32 of a computer connected to the digitizer of a line drawn over the tablet working surface. Locations A' and B' on the display correspond to locations A and B on the tablet 10 shown in FIG. 1.

The path 36 shown in FIG. 2 is the path reported by the prior art digitizer device when the stylus accelerates at a constant rate over the tablet 30 along the straight line 34, shown in phantom, that begins at location A' and ends at location B'. In this example, the digitizer uses a non-recursive noise filter to minimize lag, and the two-point predictive compensation to reduce the sampling hysteresis errors of tablet 10 that are otherwise an annoying result of the use of such a noise filter. However, the corrections themselves introduce errors in the path 36 reported by the digitizer 10.

First of all, the reported path 36 substantially overshoots location B', because the X value ($X_p$) farthest out on the reported path of the probe was predicted from the direction and velocity of the stylus between the previous two measured positions $x_m$ and $x_n$. Those two positions were sensed at a time before the stylus arrived at location B and stopped moving, instantaneously. That stop sharply reduced stylus velocity. Thus the reported value predicted on the basis of the movement of the stylus between the two earlier $x_m$ and $x_n$ points overshoots the actual location of the stylus at B. In contrast, retrospective smoothing compensation will under-report the coordinates of B, because of the acceleration of the stylus up to the time at which the stylus reaches point B on the surface of the digitizer 30.

Under reporting of the X position values also results due to the sequential sampling. Compensating by taking into account the velocity of the stylus is not sufficient because it ignores relative acceleration of the stylus, which will occur whenever there is a change in relative motions eve though the velocity of the stylus along its path is constant.

There are better solutions to the problems described above than those heretofore used. Each of these possible solutions will be described and its pros and cons evaluated.

SOLUTION 1 (FIG. 3)

FIG. 3 illustrates a typical situation of a probe advancing along a straight line 40 while successively making alternate X and Y coordinate measurements, where $x_1$, $y_1$ are the first set; $x_2$, $y_2$ the second set; and $x_3$, $y_3$ the third set. In FIG. 3, T is the time between successive scans along the same coordinate axis, and $\Delta T$ is the adjusted report time to compensate for the lag between the X and Y sampling. For Solution 1, with prediction: adjust X to catch up to Y, and $\Delta T_y = 0$.

The equations which define the reported coordinate values $X_r$ and $Y_r$ are:

$$X_r = x_2 + (x_2 - x_1)\left(\frac{\Delta T_x}{T}\right) + \left(\frac{x_2 - 2x_1 + x_0}{2}\right)\left(\frac{\Delta T_x}{T}\right)^2. \tag{1}$$

$$Y_r = y_2. \ (\Delta T_y = 0) \tag{2}$$

The first two terms in equation (1) compensate for stylus velocity, and the third term compensates for stylus acceleration. This solution uses prediction to estimate $X_r$ (but not $Y_r$), and this can result in overshoots when quick changes are made, but it has minimal lag. FIG. 3A illustrates the overshoot. If the stylus traces out the character "Z" 42, then the monitor display 43 will show extensions at the corners along the X axis.

SOLUTION 2 (FIG. 4)

FIG. 4 illustrates at 44 a non-predictive solution with lookback. In this $\Delta T_x = 0$, so Y is adjusted for reporting at the earlier X sampling time. The equations are:

$$Y_r = y_2 - (y_2 - y_1)\left(\frac{\Delta T_y}{T}\right) - \left(\frac{y_2 - 2y_1 + y_0}{2}\right)\left(\frac{\Delta T_y}{T}\right)^2 \tag{3}$$

$$X_r = x_2 \tag{4}$$

with, again, the first two terms representing velocity compensation and the third term acceleration compensation.

In this solution, using lookback to estimate $Y_r$ can result in undershoot when quick changes are made. FIG. 4A shows the effect at 46 when the stylus traces the character "N" 45.

SOLUTION 3 (FIG. 5)

FIG. 5 illustrates at 48 a solution including both prediction and lookback, where both reported coordinate values are adjusted; X by solution 1 and Y by solution 2. The equations, with the same meanings as before, are:

$$X_r = x_2 + (x_2 - x_1)\left(\frac{\Delta T_x}{T}\right) + \left(\frac{x_2 - 2x_1 + x_0}{2}\right)\left(\frac{\Delta T_x}{T}\right)^2 \quad (5)$$

$$Y_r = y_2 - (y_2 - y_1)\left(\frac{\Delta T_y}{T}\right) - \left(\frac{y_2 - 2y_1 + y_0}{2}\right)\left(\frac{\Delta T_y}{T}\right)^2 \quad (6)$$

This solution uses a compromise of both previous solutions, halving the benefits and drawbacks.

Implementing Solutions 1, 2 and 3 is straightforward. The various X and Y coordinates values at the different times indicated are stored, the sampling times T and $\Delta T_x$ and $\Delta T_y$ are stored, and the corrected values $X_r$ and $Y_r$ calculated in accordance with the equations indicated using the microprocessor conventionally included in such tablets.

For a better understanding of the significance of the various terms in the above equations, the following should be noted. If the X and Y coordinates could be sampled simultaneously, $\Delta T = 0$; and when each is sampled for the same amount of time, or each for one-half the available time, $\Delta T = \frac{1}{2}$. In a typical situation, where 100 reports per second are required—leaving 10 ms for sampling and reporting—each of X and Y can be sampled for 1 ms, and the time to report 3 ms, for a total sample/report cycle time of 5 ms.

Figure 10A:
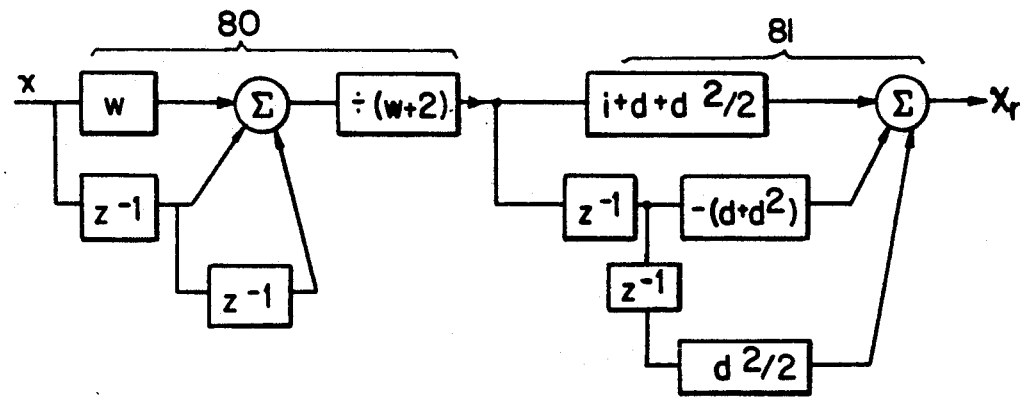
FIGS. 10A-10C are block diagrams of various circuits for implementing the method of the invention.
Figure 10B:
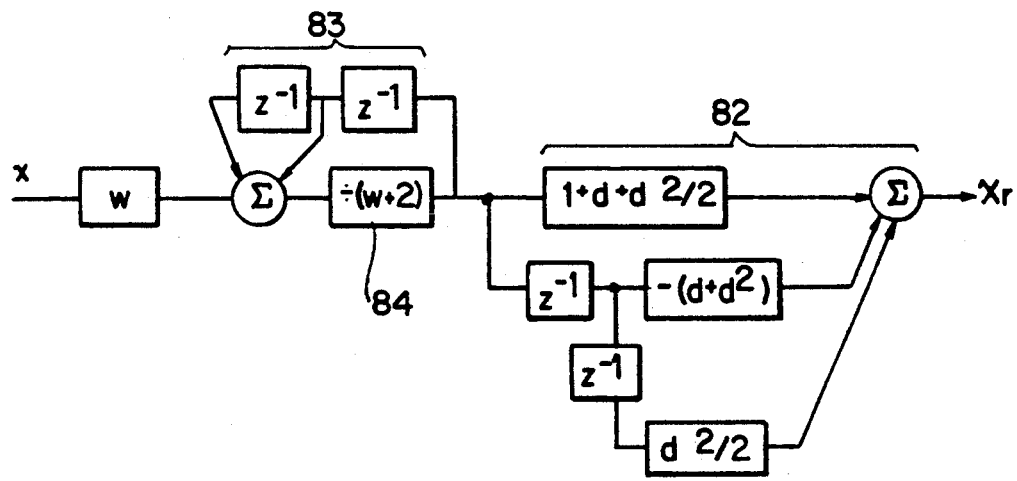
Figure 10C:
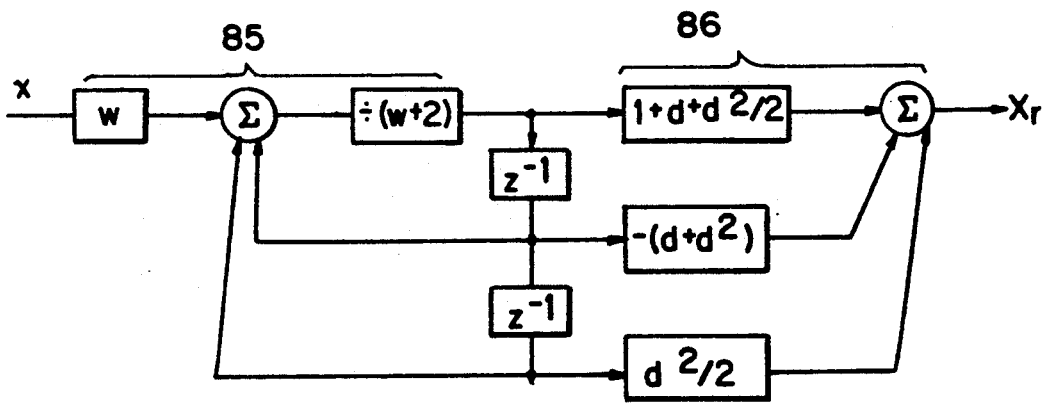

FIGS. 10A, 10B, and 10C, described later in more detail, are block diagrams of an equivalent circuits for implementing several of the integrated solution including the integrated solutions for the X coordinate. Similar circuitry would be required if correction of the Y coordinate were also to be carried out. In these figures, x represents the inputted uncorrected coordinate value, w is a weighted filter element, $z^{-1}$ represents a storage block providing a delay equal to T, $\Sigma$ a summation node, and $X_r$ the reported corrected coordinate value.

SOLUTION 4 (FIG. 6)

An even better solution is to compensate for lag between collection and reporting, independent of whether X and Y are collected sequentially or not.

This is illustrated in FIG. 6A at 50 for the X correction, and in FIG. 6B at 51 for the Y correction. The equations are:

$$X_r = x_2 + (x_2 - x_1)\left(\frac{\Delta T_x}{T}\right) + \left(\frac{x_2 - 2x_1 + x_0}{2}\right)\left(\frac{\Delta T_x}{T}\right)^2 \quad (7)$$

$$Y_r = y_2 + (y_2 - y_1)\left(\frac{\Delta T_y}{T}\right) + \left(\frac{y_2 - 2y_1 + y_0}{2}\right)\left(\frac{\Delta T_y}{T}\right)^2 \quad (8)$$

with, again, the first two terms of each representing velocity correction, and the third term acceleration correction. In this case, $\Delta T_x$ and $\Delta T_y$ are the times between collection and reporting.

Different kinds of tablet architectures may have different scan rates requiring optimal compensation. For the more common kind, where $\Delta T = \frac{1}{2}$, the reported value using equation (7) for $X_r$ would be:

$$X_r = x_2(13/8) - x_1(6/8) + x_0(\tfrac{1}{8}) \quad (9)$$

For a different tablet architecture, where $\Delta T = \frac{1}{4}$, $X_r$ would be:

$$X_r = x_2(41/32) - x_1(10/32) + x_0(1/32) \quad (10)$$

For still a third tablet architecture, where $\Delta T = -\frac{1}{2}$, $X_r$ would be:

$$X_r = x_2(\tfrac{3}{8}) - x_1(-2/8) + x_0(\tfrac{7}{8}) \quad (11)$$

It will be noted (the significance of which will be explained later) that the formulas reduce to three sampled values per coordinate, each multiplied by a different coefficient, the sum of which coefficients equals 1.

The choice of solution will be dictated by the application requirements and manufacturing costs. In general, the more calculations, the fewer reports and slower responsiveness. To speed up the computation, a faster (more expensive) processor capable of handling larger words per instruction cycle can be used. The following will assist the person skilled in the art in making an appropriate choice. The algorithm described can be employed either in the tablet, or as a post process on the host computer.

If $(\Delta T)_{1/T}$ is specified as a power of 2 ($\frac{1}{2}$, $\frac{1}{4}$, $\frac{1}{8}$, $\frac{1}{16}$, etc.), the algorithm can be implemented with a multiply and shift. Solutions 1 or 2 can be implemented with a minimum of two memory items for storing $x_1$, $x_0$ (or $y_1$, $y_0$) (see FIG. 10C). Solutions 3 and 4 require at least four memory items, as both X and Y are being corrected.

To determine parameters of the applicable equations (if they're not known by design) (FIG. 7):

Step 1. Trace a diagonal line 55, up and back, and note the shape of reported coordinates as displayed on the monitor;

Step 2. If the result is as depicted in FIG. 7A, $\Delta Tx = 0$, $\Delta Ty = 0$, goto step 3;

If the result is as depicted in FIG. 7B, where $\Delta Ty = 0$, adjust $\Delta T_{x/T}$ by trial and error (using a binary search technique) until FIG. 7A is achieved, then goto step 3;

If the result is as depicted in FIG. 7C, where $\Delta Tx = 0$, adjust by trial and error (using a binary search) until FIG. 7A is achieved, then goto step 3.

Step 3. Now that X-Y latencies are compensated for, any lags or overshoots can be compensated by increasing (to fix lag) or decreasing (to fix overshoot) both $\Delta T_{x/T}$ and $\Delta T_{y/T}$ by the same amount.

Figure 8A:
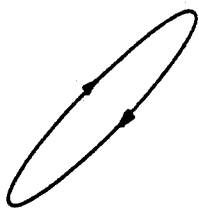
FIGS. 8A-8E illustrate a cut and try method for compensating for hysteresis.
Figure 8B:
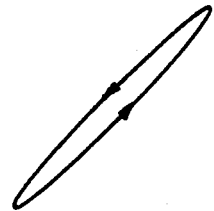
Figure 8C:
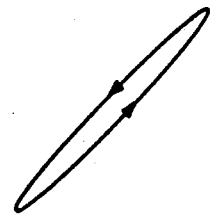
Figure 8D:
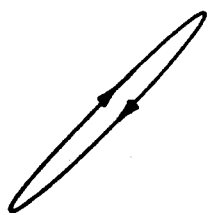
Figure 8E:
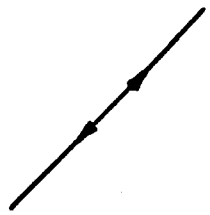

Examples are illustrated in FIGS. 8A–8E. In FIG. 8A, X lags Y, therefore try $\Delta T_x/T = \frac{1}{2}$, $\Delta T_y = 0$. In FIG. 8B, Y lags X, therefore $\Delta T_x/T$ is too much; try $\Delta T_x/T = \frac{1}{4}$. In FIG. 8C, $\Delta T_x/T$ is still too much; try $\Delta T_x/T = \frac{1}{8}$. In FIG. 8D, back to X lagging Y, therefore not enough, try $\Delta T_x/T = 3/16 (>\frac{1}{8}, <\frac{1}{4})$. FIG. 8E shows virtually no lag; therefore for this instance $\Delta T_x/T = 3/16$, $\Delta T_y/T = 0$.

If lag is still seen, try $\Delta T_x/T = 3/16 + \frac{1}{8}$, $\Delta T_y/T = \frac{1}{8}$, and adjust the "$\frac{1}{8}$" until it looks satisfactory (increase to remove lag). If overshoot is seen, try $\Delta T_x/T = 0$, $\Delta T_y/T = -3/16$, then adjust for lag.

What has been discussed above is how on an empirical basis one can determine $\Delta T_x/T$ or $\Delta T_y/T$ or both. When this has been accomplished, the resultant values can be plugged into the equations indicated above to produce the compensated X or Y coordinate values.

When this cut and try method has succeeding in producing the desired curve of FIG. 8E, all tablets with the same architecture would be expected to produce the same results. It is thus straightforward to determine values for correcting either or both of the X and Y coordinates for all such tablets. The equations then reduce to:

$$X_r = k_2 x_2 + k_1 x_1 + k_0 x_0 \qquad (9)$$

where $k_0$, $k_1$ and $k_2$ are fixed constants determined as indicated above from the time lag between the sampling of X and the reporting of X, based on the tablet's architecture, and $$k_0 + k_1 k_2 = 1 \qquad (10)$$

A similar equation would exist for Y, but in most instances it would be sufficient to report with the last sampled Y value the corrected X value. Both coordinate values would not normally need correction since the adjustment of the first coordinate to be measured is generally adapted to the measurement time of the second coordinate.

Figure 9:
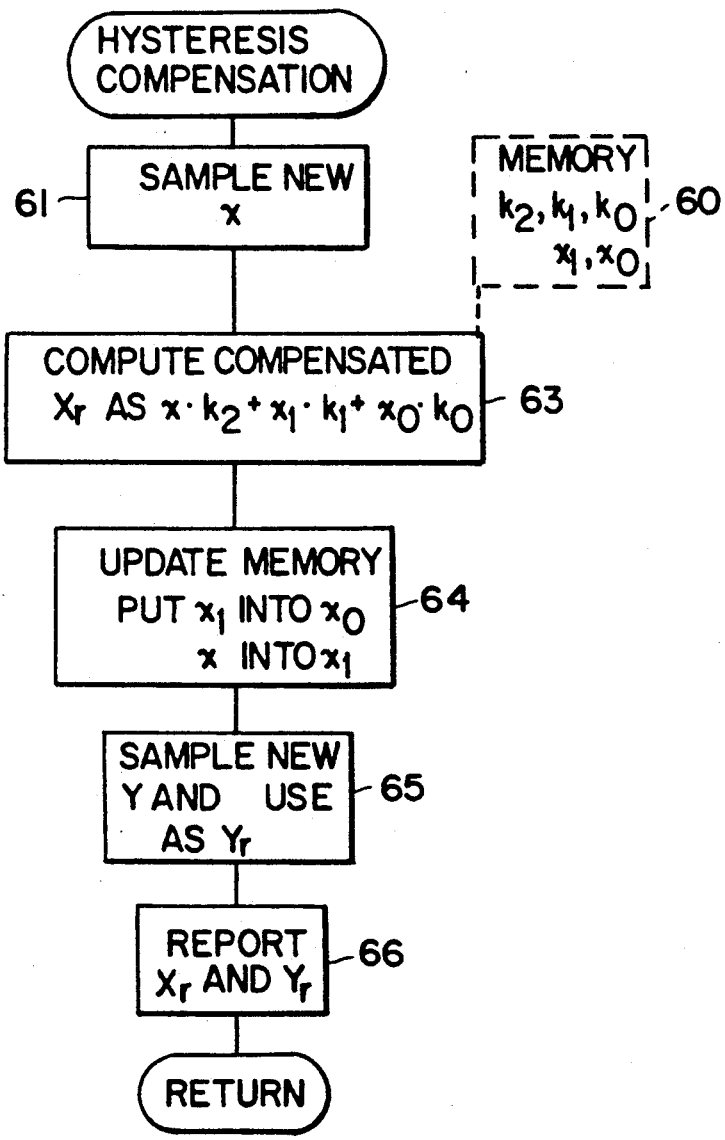
FIG. 9 is a flow chart of a hysteresis compensation method.

Once the constants $k_2$, $k_1$, and $k_0$ have been determined by the trial and error method described above, the correction algorithm can be built into the tablet software. This is illustrated in FIG. 9, which is a flow chart of the correction algorithm, assuming that the constants $k_2$, $k_1$ and $k_0$ have been previously determined and can be stored in ROM in the tablet, indicated at 60. In the first block 61, the X coordinate is sampled, giving $x_2$ which can be stored in memory. The previous values for $x_1$ and $x_0$ determined during previous scans have also been saved. The stored values of $X_1$, $X_0$ are updated by assigning X to $X_1$ to $X_0$ at 64. $X_r$ is then calculated 63 using equation (9) and stored. Y is then sampled at 65 and stored as $Y_r$. The tablet then reports 66 the sampled $Y_r$ plus the corrected $X_r$ retrieved from memory if necessary.

The above description provides for velocity and acceleration compensation to correct for hysteresis, and requires two storage elements for each axis being corrected.

Tablets can employ recursive or non-recursive weighted averaging filter techniques to minimize noise effects. In this noise-filtering process, successive signal values $x_0$, $x_1$ and $x_2$ are weighted and then averaged in a suitable manner to determine a filtered coordinate value $X_3$. Similarly, the weighted average of $x_1$, $x_2$ and $x_3$ determines $X_4$, and so on.

The basic difference between the use of a recursive or a non-recursive filter is the way in which the averaging is carried out. With a recursive filter, each new average is based on the previous average—therefore the old data which was used to produce the previous average need not be saved—whereas with a non-recursive filter, the old data is averaged with the new data, so the old data must be saved. Recursive filters provide for better smoothing (noise filtering) but more significant lag than non-recursive filters, and either approach typically requires two storage elements for each axis being filtered.

An integration of both a recursive filter to provide noise reduction and hysteresis compensation is shown in FIG. 10, and is the preferred embodiment for a practical digitizer, in that it incorporates both improvements while only requiring two-storage elements per axis, rather than the four which would be required if implemented separately.

Figure 11:
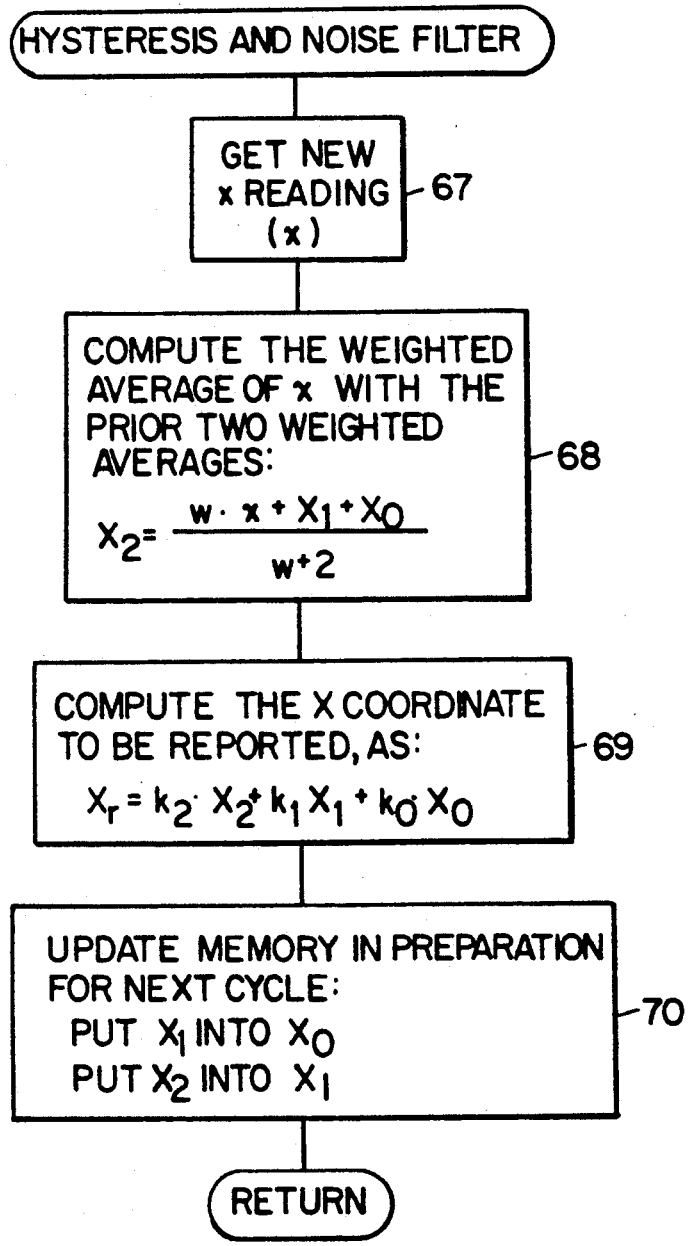
FIG. 11 is a flow chart of another hysteresis compensation method which is preferred.

The FIG. 11 flowchart for the integrated embodiment is similar to that of FIG. 9, in which at block 67 the new X reading is fetched, and used at block 68 in the calculation of the weighted average, $X_2$, of X with the prior two weighted averages, $X_1$, $X_0$, where w is the weighted filter element. Then the X coordinate to k reported is calculated at block 69 using the three coefficients stored in memory. Block 70 then updates the X values for the next cycle.

The identical routine would be repeated for the Y coordinate, but with different coefficients $k_0$, $k_1$, $k_2$ customized for that axis.

In FIG. 10A, the left half 80 of the circuit represents a 3-point, weighted, non-recursive noise filter, and the right half 81 a 3-point non-recursive hysteresis correction.

In FIG. 10B, the right half 82 is the same as in FIG. 10A, but the left half 83 represents a 3-point recursive noise filter. Both the FIG. 10A and 10B embodiments require four storage elements, represented by the four storage blocks $z^{-1}$.

FIG. 10C shows the preferred embodiment which integrates the filter half and the hysteresis correction half, thereby reducing the storage requirement to only two storage elements which provide the necessary delays for both the 3-point, weighted, recursive, noise filter half 85, and the 3-point non-recursive hysteresis correction half 86.

The terms $(1+d+d^{2/2})$, $-(d+d^2)$, and $(d^{2/2})$ are constant for a given tablet architecture. Once they are determined (by design or by cut and try as previously discussed), they can be stored in ROM as $K_2$, $k_1$, and $k_0$, and used as shown in the flowchart of FIG. 11.

The preferred embodiments described provide greater noise immunity, needed for use in industrial settings, by using a recursive noise filter. Moreover, they provide good overall responsiveness by avoiding the delays inherent in retrospective compensation for accurately reporting curvatures regardless of relative or actual changes in acceleration.

Although the present invention has been described with particular reference to presently preferred embodiments, it will be apparent to one skilled in the art that other variations, as well as modifications thereof, can be made within the spirit and scope of this invention. For example, the disclosed invention is also applicable both to cursor-driven and grid-driven, inductively-coupled or capacitively-coupled digitizer devices, as well as to contact coupled digitizers.

What is claimed is:

1. In a digitizer tablet having a pointing device, a method for determining and reporting the X-Y coordinates of the pointing device, relative to the tablet, corrected for pointing device movements, comprising the steps:

(a) determining but not reporting the coordinate positions of the pointing device along a first coordinate axis during successive time points, (b) using the determined coordinate positions of step (a), based on the pointing device's velocity and acceleration determined from said use, calculating the coordinate position along said first coordinate axis that the pointing device would assume at a future time point, (c) reporting the coordinate position calculated in step (b).

2. The method of claim 1, wherein the duration from the last time point to said future time point is substantially the same as that of the last time point from the previous time point.

3. The method of claim 2, wherein the calculation of step (b) is based on three consecutive time points.

4. The method of claim 3, wherein the coordinate position of the pointing device along a second coordinate axis is reported at about the same time as the first coordinate position is reported.

5. The method of claim 1, further comprising: repeating steps (a), (b) and (c) with respect to a second coordinate axis.

6. In a digitizer tablet having a pointing device, a method for determining and reporting the pointing device's X-Y coordinates relative to the tablet corrected for pointing device movements, comprising the steps:
(a) determining the coordinate positions of the pointing device along at least one of the X and Y axes during at least three successive time point $t_0$, $t_1$ and $t_2$ to produce three corresponding positions $p_0$, $p_1$ and $p_2$.
(b) calculating a corrected value $P_r$ for the pointing device coordinate position $p_2$, where $$P_r = k_2 p_2 + k_1 p_1 + k_0 p_0,$$

(c) reporting the corrected value $P_r$ at a time $t_3$, where $k_0$, $k_1$ and $k_2$ are fixed constants determined by the time lag between $t_3$ and $t_0$.

7. The method of claim 6, wherein one of the terms of the equation for $P_r$ represents pointing device velocity, and another of the terms represents pointing device acceleration.

8. The method of claim 6, wherein $k_0 + k_1 + k_2 = 1$.

9. In a digitizer tablet having a pointing device, the method for reporting the pointing device X-Y coordinates relative to the tablet corrected for pointing device movements, comprising the steps:
(a) determining the coordinate positions of the pointing device along at least one of the X and Y axes during at least three successive time points $t_0$, $t_1$ and $t_2$ to produce three corresponding positions $p_0$, $p_1$ and $p_2$,
(b) determining from the time points and corresponding position points values representing the velocity and acceleration of the pointing device in moving from position $p_0$ to $p_2$,
(c) calculating for a time point $t_3$ a value $p_3$ for the pointing device coordinate position which the pointing device will occupy at the time point $t_3$, where $t_3 > t_2 > t_1 > t_0$,
(d) reporting the calculated value $p_3$ at the time $t_3$.

10. In a digitizer tablet having a pointing device, the method for reporting its X-Y coordinates relative to the tablet corrected for pointing device movements, comprising the steps:
(a) determining and storing the constant coefficients $k_2$, $k_1$, and $k_0$ of an equation defining a corrected value, $P_r$, of an X or Y coordinate position, wherein the equation is of the form:

$$P_r = k_2 p_2 + k_1 p_1 + k_0 p_0,$$

and $p_0$, $p_1$, and $p_2$ are measured coordinate values during consecutive time points,
(b) determining the coordinate positions of the pointing device along at least one of the X and Y axes during at least three successive time points $t_0$, $t_1$ and $t_2$ to produce three corresponding positions $p_0$, $p_1$ and $p_2$,
(c) evaluating the said equation using the stored constant coefficients and the determined positions.

11. The method of claim 10, wherein $k_0 + k_1 + k_2 = 1$.

12. The method of claim 11, wherein step (a) is carried out by moving the pointing device back and forth along a sloped line and observing the shape of the displayed line using the reported coordinates.

13. The method of claim 11, wherein step (a) is carried out by a trial and error method.

14. The method of claim 13, wherein the coefficients are of the form N/D, where D equals a power of 2.

15. The method of claim 10, wherein the value of $P_r$ determined in step (c) is reported.

16. A digitizer tablet having a pointing device, and means for reporting its X-Y coordinates relative to the tablet corrected for pointing device movements, said means for reporting comprising:
(a) means for determining the coordinate positions of the pointing device along at least one of the X and Y axes during at least three successive time points $t_0$, $t_1$ and $t_2$ to produce three corresponding positions $p_0$, $p_1$ and $p_2$,
(b) means for determining from the time points and corresponding position points values representing the velocity and acceleration of the pointing device in moving from position $p_0$ to $p_2$,
(c) means for calculating for a time point $t_3$ a value $p_3$ for the pointing device coordinate position which the pointing device will occupy at a time point $t_3 > t_2 > t_1 > t_0$,
(d) means for reporting the calculated value $p_3$ at the time $t_3$.

17. The tablet of claim 16, further comprising a weighted non-recursive or recursive noise filter.

18. A digitizer tablet having a pointing device, and means for reporting its X-Y coordinates relative to the tablet corrected for pointing device movements, comprising:
(a) means for storing the constant coefficients $k_2$, $k_1$, and $k_0$ of an equation defining a corrected value, $P_r$, of an X or Y coordinate position, wherein the equation is of the form:

$$P_r = k_2 p_2 + k_1 p_1 + k_0 p_0,$$

and $p_0$, $p_1$, and $p_2$ are coordinate values during consecutive time points,
(b) means for determining the coordinate positions of the pointing device along at least one of the X and Y axes during at least three successive time points $t_0$, $t_1$ and $t_2$ to produce three corresponding positions $p_0$, $p_1$ and $p_2$,
(c) means for evaluating the said equation using the stored constant coefficients and the determined positions to determine $P_r$,
(d) means for reporting $P_r$.

19. The tablet of claim 18, wherein the means for calculating comprises at least two storage elements providing delays, means for multiplying the inputted and delayed values by the coefficients, and means for summing the multiplied values.

20. The tablet of claim 19, further comprising a three-point recursive noise filter integrated with the calculating means and using the same two storage elements.

21. The tablet of claim 18, wherein $p_2$, $p_1$, and $p_0$ are measured values.

22. The tablet of claim 18, wherein one or more of the coordinate values $p_2$, $p_1$, and $p_0$ are preprocessed coordinate values for reducing noise, tilt, or other extraneous factors.

* * * * *